US009015616B2

(12) United States Patent
Tseng et al.

(10) Patent No.: US 9,015,616 B2
(45) Date of Patent: Apr. 21, 2015

(54) SEARCH INITIATION

(75) Inventors: Erick Tseng, San Francisco, CA (US);
Nickolas Jay Sears, Renton, WA (US)

(73) Assignee: Google Inc., Mountain View, CA (US)

(*) Notice: Subject to any disclaimer, the term of this patent is extended or adjusted under 35 U.S.C. 154(b) by 543 days.

(21) Appl. No.: 12/256,325

(22) Filed: Oct. 22, 2008

(65) Prior Publication Data

US 2010/0100839 A1     Apr. 22, 2010

(51) Int. Cl.
| G06F 3/048 | (2013.01) |
| G06F 3/14 | (2006.01) |
| G09G 5/00 | (2006.01) |
| G06F 3/041 | (2006.01) |
| G06F 3/042 | (2006.01) |
| G06F 3/043 | (2006.01) |
| G06F 3/045 | (2006.01) |
| G06F 3/033 | (2013.01) |
| H04M 1/02 | (2006.01) |
| G06F 9/44 | (2006.01) |
| G06F 3/0488 | (2013.01) |
| G06F 3/0482 | (2013.01) |
| G06F 1/16 | (2006.01) |
| G06F 3/0481 | (2013.01) |
| H04M 1/725 | (2006.01) |

(52) U.S. Cl.
CPC ........... *H04M 1/0235* (2013.01); *G06F 9/4443* (2013.01); *G06F 3/0488* (2013.01); *G06F 3/0482* (2013.01); *G06F 1/1624* (2013.01); *G06F 1/1626* (2013.01); *G06F 1/1643* (2013.01); *G06F 1/1677* (2013.01); *G06F 3/0481* (2013.01); *H04M 1/72561* (2013.01)

(58) Field of Classification Search
CPC ... G06F 3/0481; G06F 3/0482; G06F 3/0488; G06F 9/4443
USPC .......... 345/168, 169, 173–179, 773; 715/773, 715/780, 781, 802, 864
See application file for complete search history.

(56) References Cited

U.S. PATENT DOCUMENTS

| 6,564,222 | B1 * | 5/2003 | Sassano ......................... 707/736 |
| 6,578,045 | B1 * | 6/2003 | Gray et al. .............................. 1/1 |
| 6,661,432 | B1 * | 12/2003 | McBrearty et al. ........... 715/760 |
| 6,708,162 | B1 * | 3/2004 | Morgan et al. ......................... 1/1 |
| 6,785,670 | B1 * | 8/2004 | Chiang et al. ................. 707/706 |
| 6,823,491 | B1 * | 11/2004 | McBrearty et al. ........... 715/207 |

(Continued)

FOREIGN PATENT DOCUMENTS

| EP | 1 873 635 | 1/2008 |
| EP | 2 020 807 | 2/2009 |

(Continued)

OTHER PUBLICATIONS

International Search Report and the Written Opinion of the International Searching Authority, International Application No. PCT/US2009/061430, dated Mar. 19, 2010, 20 pages.

(Continued)

*Primary Examiner* — Eric J Bycer
(74) *Attorney, Agent, or Firm* — Fish & Richardson P.C.

(57) ABSTRACT

A computer-implemented user input method includes sensing a user manipulation of a mobile device to present a keyboard, automatically presenting, in response to the sensed manipulation, a search entry area on a display of the user device, and activating the keyboard to provide input into the search entry area.

19 Claims, 11 Drawing Sheets

(56) References Cited

U.S. PATENT DOCUMENTS

| | | |
|---|---|---|
| 7,831,581 B1 * | 11/2010 | Emigh et al. .................. 707/706 |
| 2002/0174134 A1 * | 11/2002 | Goykhman ................ 707/104.1 |
| 2004/0267730 A1 * | 12/2004 | Dumais et al. .................... 707/3 |
| 2005/0076022 A1 * | 4/2005 | Wu et al. ........................... 707/3 |
| 2005/0080783 A1 * | 4/2005 | Arrouye et al. ................... 707/6 |
| 2005/0083642 A1 | 4/2005 | Senpuku et al. |
| 2005/0119019 A1 * | 6/2005 | Jang ............................... 455/466 |
| 2005/0132063 A1 * | 6/2005 | Belt et al. ....................... 709/227 |
| 2005/0289109 A1 * | 12/2005 | Arrouye et al. ................... 707/1 |
| 2006/0200827 A1 * | 9/2006 | Sidlosky et al. .............. 719/310 |
| 2006/0248062 A1 * | 11/2006 | Libes et al. ....................... 707/3 |
| 2006/0294063 A1 * | 12/2006 | Ali et al. ........................... 707/3 |
| 2007/0005573 A1 * | 1/2007 | Murarka et al. .................. 707/3 |
| 2007/0027839 A1 * | 2/2007 | Ives .................................. 707/3 |
| 2007/0073718 A1 * | 3/2007 | Ramer et al. ..................... 707/10 |
| 2007/0079254 A1 * | 4/2007 | Kwak et al. ................... 715/803 |
| 2008/0033954 A1 * | 2/2008 | Brooks et al. ..................... 707/9 |
| 2008/0168396 A1 | 7/2008 | Matas et al. |
| 2008/0208834 A1 * | 8/2008 | Boyer et al. ....................... 707/5 |
| 2009/0019000 A1 * | 1/2009 | Arends et al. .................... 707/3 |
| 2009/0228825 A1 * | 9/2009 | Van Os et al. ................. 715/780 |
| 2010/0110010 A1 * | 5/2010 | Choi ............................. 345/169 |

FOREIGN PATENT DOCUMENTS

| | | |
|---|---|---|
| GB | 2 389 011 | 11/2003 |
| WO | WO 2006137993 A2 * | 12/2006 |
| WO | 2007/014064 | 2/2007 |

OTHER PUBLICATIONS

International Preliminary Report on Patentability for Application No. PCT/US2009/061430, dated May 5, 2011, 8 pages.

* cited by examiner

SEARCH INITIATION

TECHNICAL FIELD

This document relates to systems and techniques for generating graphical display elements and controls.

BACKGROUND

Internet search is an enormous business and continues to grow. It is successful because people want relevant information in response to their questions, and search engines do a better job than ever before of sorting the wheat from the chaff for search engine users.

People are also increasingly using search functionality on their mobile computing devices. For example, mobile devices may be especially helpful in providing local information superimposed on maps, so that a user of a mobile device can easily find a local restaurant or store. Users may also want to search locally on their device, such as to search for the name of a friend within a long list of contacts on their mobile device.

SUMMARY

This document describes systems and techniques that may be used to interact with a user of a computing device like a mobile telephone. In general, the systems may detect when a user slides open a slider cell phone or flips open a clamshell cell phone to uncover a keyboard for the phone. The techniques described herein may react in particular ways to the exposing of a keyboard mechanism, such as providing immediate search functionality to a user of such a device. In other words, when the keyboard first becomes exposed, a device may assume that a user intends to type into the device, and may assume that such typing is likely to involve the submission of a search query. In certain implementations, presentation of a search input mechanism such as a search box, may be initiated by exposing a virtual keyboard on a screen of a device, or simply by a user typing in a particular context, such as by the user typing when a desktop with icons is being displayed. Search functionality may include web searching, local searching, application specific searching, library searching and other software searching functionality.

In certain implementations, such systems and techniques may provide one or more advantages. For example, a device that automatically displays a search screen upon engaging a keyboard can ensure that a user can quickly find information related to the current active application. Without the automatic presentation of a search entry area or other query entry mechanism, the user may have to navigate to the search entry area in several steps rather than simply typing in the desired search query when provided with access to the keyboard.

In one implementation, a computer-implemented user input method is disclosed. The method comprises sensing a user manipulation of a mobile device to present a keyboard, automatically presenting, in response to the sensed manipulation, a search entry area on a display of the user device, activating the keyboard to provide input into the search entry area, receiving textual user input at the keyboard and inserting the input in the search entry area. The user manipulation can comprise sliding a mechanical keyboard from under a front portion of the mobile device, and into an open position. Also, the user manipulation can comprise rotating the mobile device from a portrait orientation to a landscape orientation.

In certain aspects, upon receiving user input, an active cursor can be positioned in the automatically presented search entry area. In some aspects, before automatically presenting the search entry area, the method can include determining whether an active program is a program responsive to search input and present the search entry area in connection to the program only if the program is responsive to search input.

In some aspects, displaying the search entry area can comprise displaying the search entry area as a pop up box over the active application. The method can include receiving a search query with the search entry area, providing search results received in response to the query to the active application, and changing a display of the active application to reflect the received search results. In certain aspects, if the active program is not responsive to search input, the method can comprise opening a search entry area separate from the active application, receiving a search query with the search entry area, and providing search results received in response to the query in a display apart from the active application. The search results can be obtained from a search set type corresponding to an application type of the active application. The search set type can be selected from a group including a map search, local search, web search, book search, blog search, and product search.

In another implementation, a computer-implemented user input system is disclosed. The system comprises a concealable keyboard having a first mode in which the keyboard is not accessible to a user and a second mode in which the keyboard is accessible to a user, a keyboard monitor to determine when the concealable keyboard transitions from the first mode to the second mode, and a search application programmed to generate a search entry area automatically when the keyboard monitor determines that the keyboard has moved from the first mode to the second mode. In certain aspects, text entered on the keyboard after the keyboard transitions from the first mode to the second mode can be entered in the search entry area automatically.

The system also comprises, in some implementations, a mechanical QWERTY slide-out keyboard and the keyboard monitor can include a switch in a slide-out mechanism. The system may further comprise an application that is active on the device and is programmed to receive search results in response to submission of a search query from the search entry area. The search application in the system can be programmed to automatically position an active cursor in the search entry area upon automatically presenting the search entry area.

In another implementation, a computer-implemented user input system is disclosed. The system comprises a concealable keyboard having a first mode in which the keyboard is not accessible to a user and a second mode in which the keyboard is accessible to a user, a keyboard monitor to generate a signal when the concealable keyboard transitions from the first mode to the second mode, and a means for presenting a search entry area to a user for entry of a search query using the keyboard.

DESCRIPTION OF DRAWINGS

Like reference symbols in the various drawings indicate like elements.

DETAILED DESCRIPTION

Figure 1:
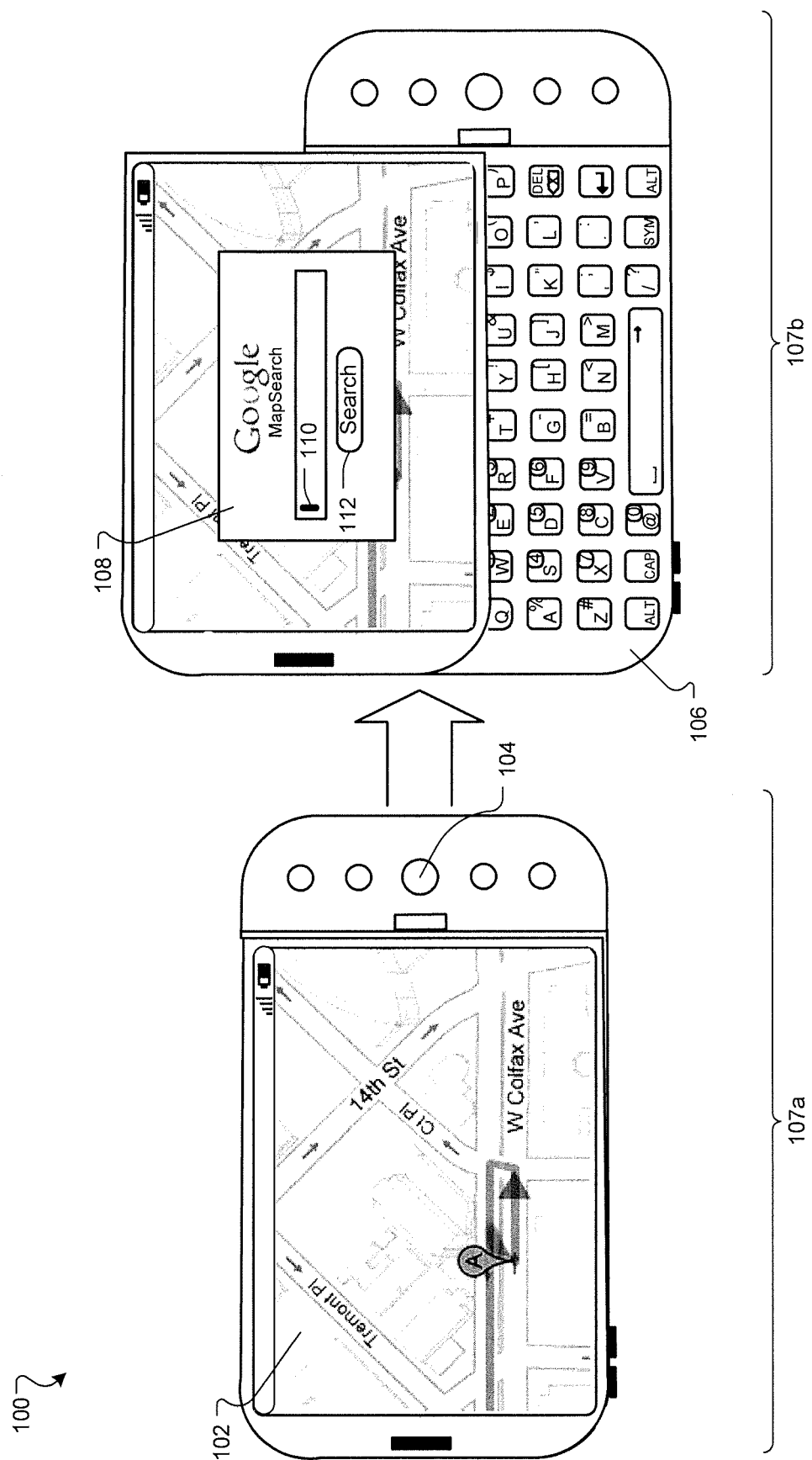
FIG. 1 shows a mobile device that presents a search box in response to unveiling a keyboard.

This document describes systems and techniques by which mobile devices may interact with users of such devices. In general, a mobile device may include a keyboard, a touchscreen, a roller ball, a switch, or other input device for receiving tactile feedback from a user. The input devices may be provided at various locations on, or attached to, the mobile device. For example, input devices can be connected to the exterior of the mobile device (e.g., a USB keyboard), permanently mounted to the mobile device (e.g., a button or switch), detachably mounted to the mobile device (e.g., a stylus) or hidden within the mobile device (e.g., a slidable keyboard or clamshell keyboard). A user can access one or more of the input devices to perform various actions. In one example, a user may unveil a hidden keyboard on a mobile device by performing a manipulation of the device, such as sliding, turning, flipping, or twisting one or more mobile device component.

Hiding or enclosing one or more input device within a mobile device can provide the advantage of safely storing device hardware to ensure damage does not occur. In some implementations, hiding an input device, such as a keyboard, may be provided as a convenience when the user wishes to use only a portion of the mobile device. For example, if the user selects a control on the mobile device intended to initiate voice dialing functionality, a keyboard input may not be required to perform any portion of the voice dialing task. Accordingly, it may be convenient to store the keyboard until an application or other task requires keyboard use.

Certain tasks performed using mobile devices can be best accomplished with the use of a keyboard. For example, text messaging or composing email may be easiest to perform with the use of a keyboard, such as a full QWERTY keyboard, rather than a number pad. In some implementations, mobile device manufacturers provide an easily accessible keyboard on the outer surface of the phone. In other implementations, mobile device manufacturers provide a hidden keyboard within the mobile device that can be activated by a user. For example, the user may activate a switch or slide mechanism to unveil a keyboard on the mobile device.

In this example, unveiling a keyboard on the device may trigger various applications to be presented to the user. For example, unveiling the keyboard may automatically trigger an active search entry area, such as in the form of a search box, to display within a display screen on the mobile device. The search box or other search entry area may provide search engine capabilities, including application specific searching, in addition to menu selections or other software functionality. For example, the keyboard unveiling may automatically provide a mobile device user with ready access to a GOOGLE search page. Also, the unveiled keyboard may be a physical or virtual keyboard. A physical keyboard can be unveiled, and thus made accessible to a user, by sliding it out from behind another part of a mobile device or by other such mechanisms, whereas a virtual keyboard may be revealed in response to a variety of user inputs (e.g., tapping a screen or rotating a phone from a portrait to a landscape orientation).

The search box can be provided as the active application or within another active application. For example, the search box may be presented next to another active application (e.g., as a bar at the top of a graphical display) and the cursor can be focused in the search box awaiting input from a user accessing the keyboard. The user can then enter a search query to search for a particular topic. In some implementations, the search engine box may be used to search within files stored on a mobile device, or other resources, or networks available to the mobile device.

Providing focus on the search box upon enabling keyboard functionality can allow a user to immediately enter search query data for finding web content, maps, contacts, program information, and other searchable data. In some implementations, the search box can be a context-dependent search box. A context dependent search box considers the context of one or more actively running applications, or the content of data entered into the box, to determine the best search strategy to employ (such as by automatically selecting a corpus on which to search). For example, if the user is actively using a mapping application and slides the phone to enable the keyboard, the search box displayed may be configured to search for locations of interest, addresses, businesses and the like. Also, if the user types an address into a general search box, the search results may be displayed with a mapping application even if that application was not previously the focus of the display. And if a user types a large amount of text, the text may be entered into a composition application such as an e-mail application or word processor, under the assumption that the user did not intend to perform a search on an entry that is several sentences long.

In some implementations, the search box may be context independent and simply perform a search of the internet or a large group of items stored locally on a device (e.g., all user files) upon receiving a search query in the search box. For example, if the mobile device is showing a desktop screen and the user is not engaged in another application, the user can slide the phone to enable the keyboard, and a context independent search box can be provided. In some contexts, data entry by the user may invoke the search entry area, such as in the form of a search box. For example, if a user begins typing on a keyboard in a situation for which textual entry is not otherwise supported (e.g., if the user is on a home page or desktop of a device and has not located a cursor in any data entry area), it may be assumed that the user intends to have the entered data provided to a search application. Such providing of the data may happen automatically without changing the display on a device, or a search area may be displayed and filled with whatever characters a user of the device enters. The user may then select an appropriate control, such as an enter key, to submit whatever search query they have typed.

FIG. 1 shows a mobile device 100 that presents a search box in response to unveiling a keyboard. In this example, the device 100 is currently running a mapping application, such as GOOGLE MAPS, that is displaying a map in a graphical display 102. Typically, a user can employ the mapping application to browse for a particular location using a roller ball control 104, for example.

At some point, the user may wish to enter a new address location using the mapping application, and may do so by sliding the mobile device display 102 upward to reveal a keyboard 106. For example, the user may be viewing a map or other content in a first view 107a and may transition to a second view 107b by sliding the keyboard 106 from under a front portion of the mobile device 100. As shown, the first view 107a depicts the mobile device 100 in a concealed mode while the second view 107b depicts the mobile device 100 in an open (or partially open) mode.

The transition from concealed mode (e.g., view 107a) to open mode (e.g., view 107b) for the keyboard is generally invoked by a user. For example, a mobile device user can trigger a switch or other mechanism that can mechanically transition device 100 from the first mode (e.g., view 107a) to the second mode (e.g., view 107b). The mobile device 100 can sense the user manipulation (e.g., by a switch located near a mechanical linkage that permits sliding of the screen on the device) and automatically present a search box in the display 102 in addition to activating the keyboard 106. For example, in response to sliding graphical display 102, a map search box 108 may appear over or near the map shown in display 102 so that the user may input an address or other appropriate information. The map search box 108 may be context-dependent such that user-entered search queries are used to find maps, locations, and address information pertaining to the mapping application. That is, the map search box 108 may search a map database, a GPS database, an address database, or other mapping based data store, but may not be configured to search other databases such as email, the web, a phone directory, or other database.

The context for a context-dependent search box may also come from sources other than applications that are running on the device. For example, an accelerometer in a device may sense certain motion of the device and may match that motion to a signature to infer an activity. For example, a bobbing motion with a repeating impulse may represent that the user of the device is walking. A small vibratory motion may represent that the user is driving their car or riding on a bus or train. Thus, in the first example, when the device's keyboard is exposed, the search may be made automatically for local information (e.g., movies, restaurants, etc.), while in the second example, the search may be made automatically to a mapping application. A user can also program what searches to associate with certain contexts, such as searching their personal files when the device is at rest (e.g., because the person is sitting at their desk and working).

In some implementations, the user can configure applications to provide a simple and generic search box upon exposing the keyboard. The generic search box may be used to search a certain set of files (e.g., all user files) on mobile device 100, internet databases, or other data stores. For example, the generic search box may be presented as a GOOGLE search bar for searching the web. In the example shown in FIG. 1, the user may use a generic search box to find a nearby restaurant address before mapping the address in the mapping program.

The search box 108 may be displayed partially or wholly over an active application or a blank desktop. The search box 108 may be displayed with an active cursor 110 in the search box 108, and ready for a user to enter a search query pertaining to either an active application or a generic search. The user can then enter a search query and select the search button 112 to submit the search.

In some implementations, a search box may not be displayed upon activation of the keyboard 106. For example, if the application running in the background does not generally function with a search tool, one may not be provided. Some examples of applications that may not use search functionality include mobile phone games, configuration applications, calculator applications, etc. In some implementations, automatic provision of a search tool can be optionally configured by a user. For example, the user may wish to always perform some sort of search when opening the keyboard and can therefore, configure a context dependent or context independent search box to display on device 100. The user can also configure searches to be conducted for contexts that match all running applications, and the search results for each application may be displayed when the user enters the relevant application.

In some implementations, the display of the search box may be delayed after the opening of a keyboard for a certain time or until the occurrence of a particular event. For example, where a keyboard is revealed or has already been opened and another action occurs such as the launching of a new application, no search interface may be shown. However, as soon as the user begins typing on the keyboard, the search user interface may appear and be filled in with the data entered by the user as the user types.

In addition, in such a delayed situation and others, the type of search results, including results for data that is resident on a device or otherwise specific to a user (such as by being stored as part of a user account on a server). For example, when a user is at a home screen or desktop on a mobile device and they slide a keyboard open, no search user interface may display initially. That is because, in such a situation, the user may intend to next select an icon on a touchscreen and move it around, and not immediately use the keyboard. However, as soon as the user starts typing when on the home page or desktop, a search user interface may appear and become populated with the information that the user is entering from the keyboard.

In some implementations, a non-mechanical mechanism can be used to activate or unveil a keyboard. For example, a user may provide tactile feedback into a touchscreen by tapping a keyboard icon to display the keyboard in the mobile device screen 102. In such a situation, the search box and search results can be provided near the touchscreen keyboard upon keyboard selection, for example.

Figure 2A:
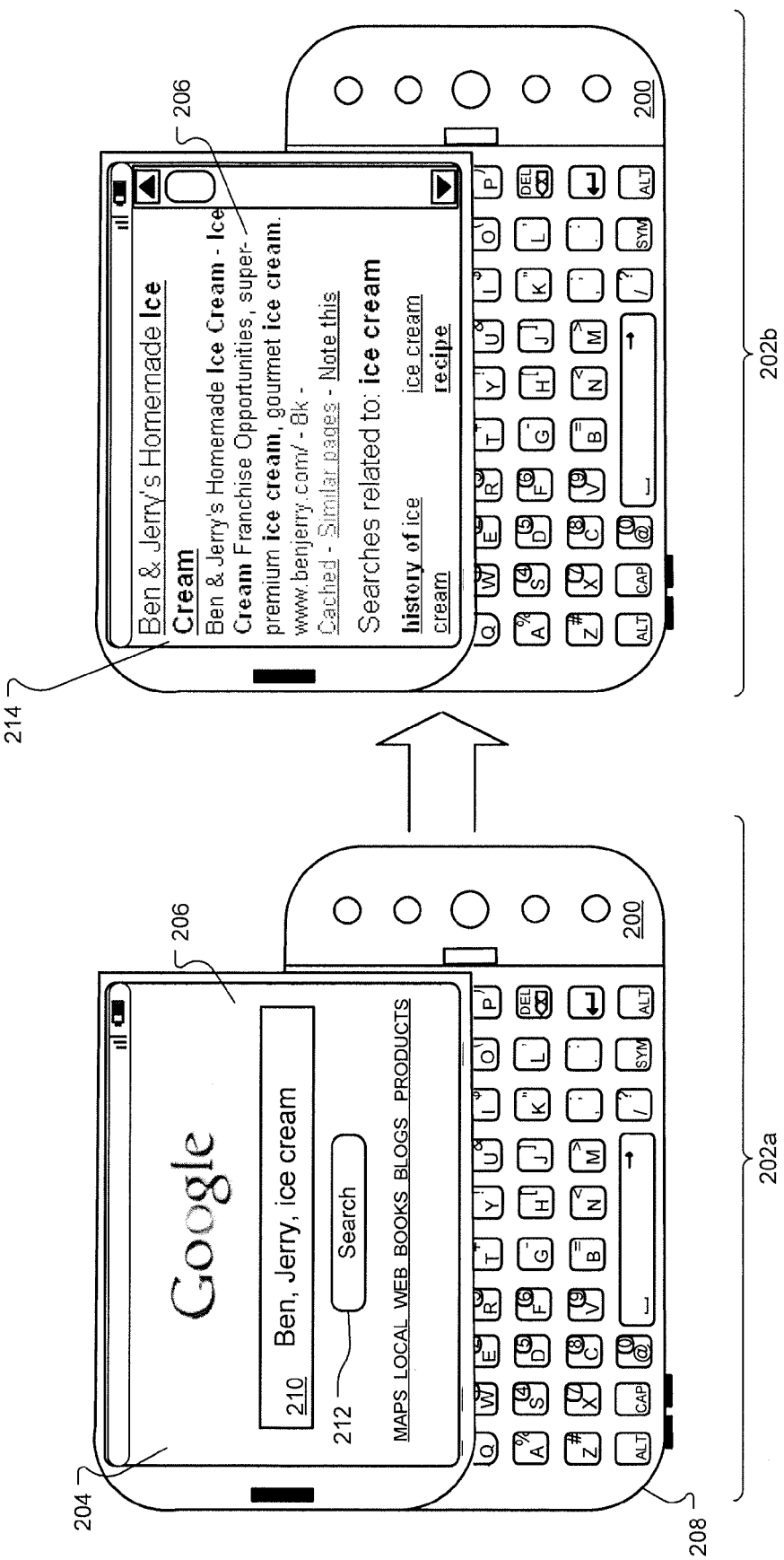
FIG. 2A shows example screen shots for a mobile device that presents a search box upon being activated with an open keyboard.

FIG. 2A shows example screen shots for a mobile device that presents a search box upon being activated with an open keyboard. In general, FIG. 2A depicts one example of how a search result box might be provided to a user. Two illustrations 202a and 202b of the same mobile device 200 are displayed at two different points in time. The illustrations 202a and 202b may be provided after a user opens the mobile device 200, for example.

The initial illustration 202a shows a general GOOGLE search box 204 located in screen 206 over the desktop of device 200. The general search box 204 may be any appropriate search engine selectable by a user or configured automatically within the mobile device. The general search box 204 may be displayed if no context exists for displaying a specialized search box. For example, if the device 200 is turned off or in hibernation mode initially, and then activated upon sliding open the screen 206 to reveal a keyboard 208, the user may not have been actively using the device 200. As such, the general search box 204 may be displayed to allow the user to search the web or their local device (e.g., via desktop search) for anything related to the entered keywords, rather than search for application-specific information. In a similar fashion, the mobile device 200 may have no actively running applications, and as such, there would be no context for providing a particular search box. In this example, the general GOOGLE search screen is presented to the user.

Although a general search box 204 is displayed by default, the user may choose to search for content that is more specific, including a map search, a local content search, a web search, a book search, a blog search, a product search, an image search, a web search, or other searches. In some implementations, the device user can configure the general search box to display a specific search website, search strategy, search genre, and may provide other limitations to the search process.

As shown in FIG. 2A, a user has activated the keyboard 208 on device 200 and entered the search terms "Ben, Jerry, ice cream" using the keyboard 208. The device 200 received the textual user input at the keyboard 208 and automatically inserted the input into a search box 210 without the user navigating to the search box. The user may select the search button to submit the search query. Other keystrokes or button combinations may be used to submit the search query. Upon receiving the search query, the search engine associated with the search box 204 can perform the search in a typical fashion.

Referring to illustration 202b, the search results 214 are displayed in screen 206. As is typical with a general web search, the search results 214 include links related to the keywords entered above (e.g., Ben & Jerry's Homemade Ice Cream link, history of ice cream link, ice cream recipe link, and other ice cream related links). In this example, the user submitted the search query outside of a particular application and as such, general search results are displayed in screen 206. In contrast, if the search had been performed within a mapping application, the search results may have provided directions to the closest Ben & Jerry's ice cream shop or another similar ice cream venue as well as address information or telephone numbers.

Figure 2B:
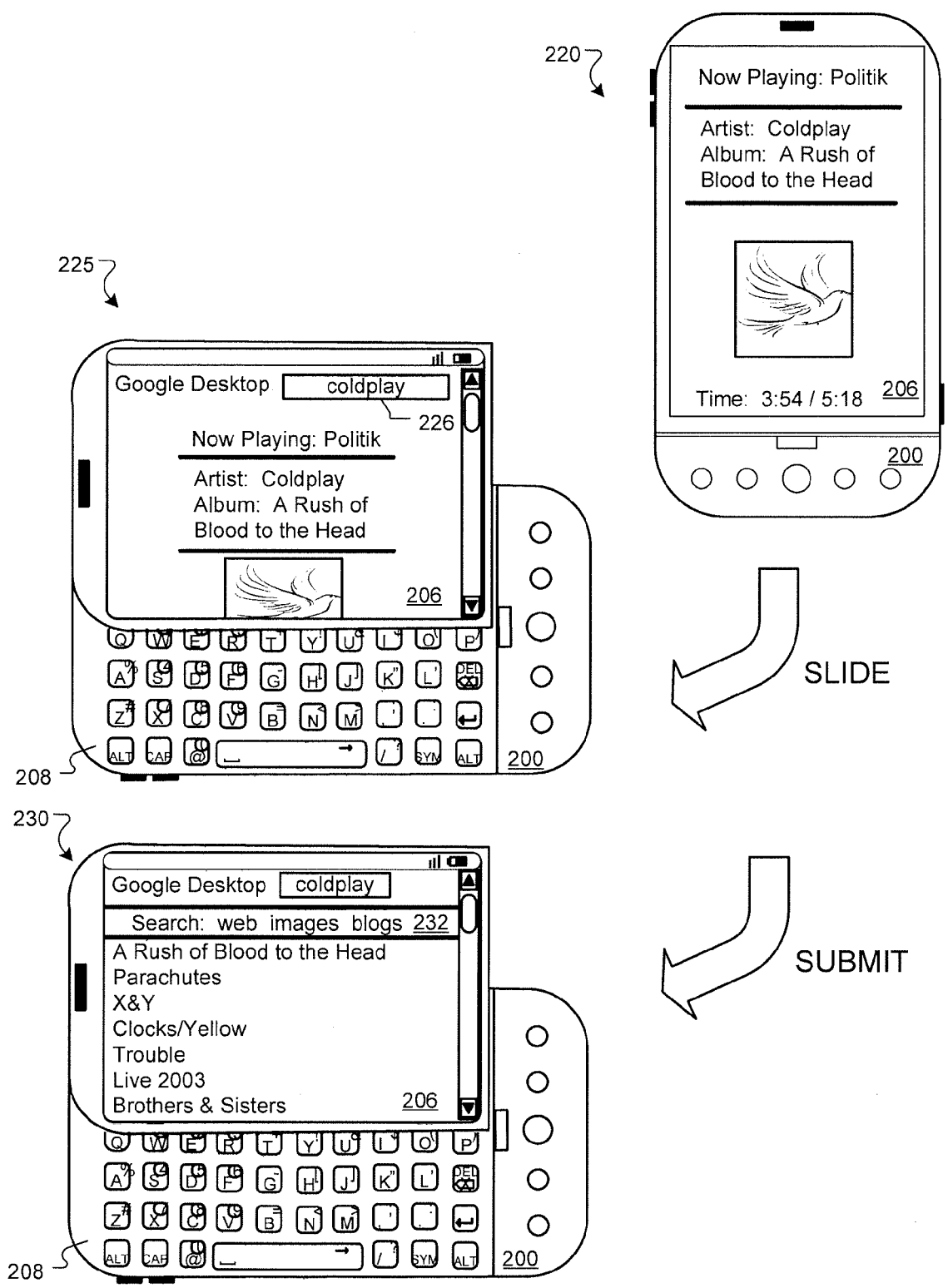
FIG. 2B shows example screen shots for a mobile device whose keyboard is opened in the middle of an operation.

FIG. 2B shows example screen shots for a mobile device 200 whose keyboard 202 is opened in the middle of an operation. Three illustrations are shown of the same mobile device 200, at three different points in time. An initial illustration 220 shows a music application playing music from the band Coldplay, as indicated on display 206. Typically, a user would not require a keyboard to simply play the music, and as such, the keyboard 208 is in the concealed mode in illustration 220. The mobile device 200 (e.g., illustration 220) is initially shown in portrait mode until a user slides the keyboard 208 open. The keyboard slide may also trigger the display 206 to rotate from a portrait orientation to a landscape orientation, as shown in the transition from illustration 220 to illustration 225. In addition, the keyboard slide triggers the display of a particular type of search box 226. Here, the search box 226 is shown as a GOOGLE desktop search box that covers only a portion of the display 206; however, other types and sizes of search boxes can be presented (e.g., a web search box that is restricted to music-related corpuses of information such as a musical analog to the Internet Move Database (imDB).

Illustration 225 depicts the search box 226 on the top portion of the display 206 which caused the other content to advance downward such that the search box 226 displaces a portion of the screen, but does not cover the display. Therefore, the full display can be seen if the user wishes to scroll downward. In some implementations, the search box 226 may cover a portion of display 206 rather than displacing the displayed content. In such a situation, the search box may be made translucent so as not to fully obscure the content underneath.

The music application shown active on the device 200 can be programmed to receive search results in response to the submission of a search query from the search box 226. In particular, the application can register with the operating system on device 200 such that an appropriate search context can be provided when a user engages a search mechanism from within the application.

In the illustration 225, the user opened (e.g., triggered) the keyboard and immediately started to enter the search term "coldplay" using keyboard 208. The mobile device 200 automatically placed the active cursor and the user-entered text into the search box 226 without the user having to navigate to the search box 226 to enter text. Thus, the mobile device 200 deduced that since the user triggered the keyboard 208, the user may wish to perform a search. Accordingly, the device 200 launched a search application and automatically placed the cursor appropriately in the search box 226.

As shown, the mobile device 200 is actively running a music application which may determine how a search is performed if the keyboard 208 is opened. For example, the search box 226 may present search results that pertain to items found within the music application or related to content found on the web, including songs, artists, playlists, artwork, and other music related items. Once the user initiates the search, the device 200 can submit the search query to a search engine adapted to find content tailored to the active music application. Certain information may be entered into the search box automatically from the application (e.g., the band name Coldplay), and the user may choose to submit that information or to augment or replace it with other information (e.g., "coldplay steve carrell movie").

A third illustration 230 depicts search results within display 206 after the search query for "coldplay" was submitted. Provision of the search results within the active application changed the display 206 to reflect the received search results. In this example, the search results include albums for the band Coldplay. The user can select any or all of the albums to play or purchase the content displayed in the result set. In some implementations, the user may select another search type using search bar 232 to expand their search to other areas, such as the web or local databases.

Figure 3A:
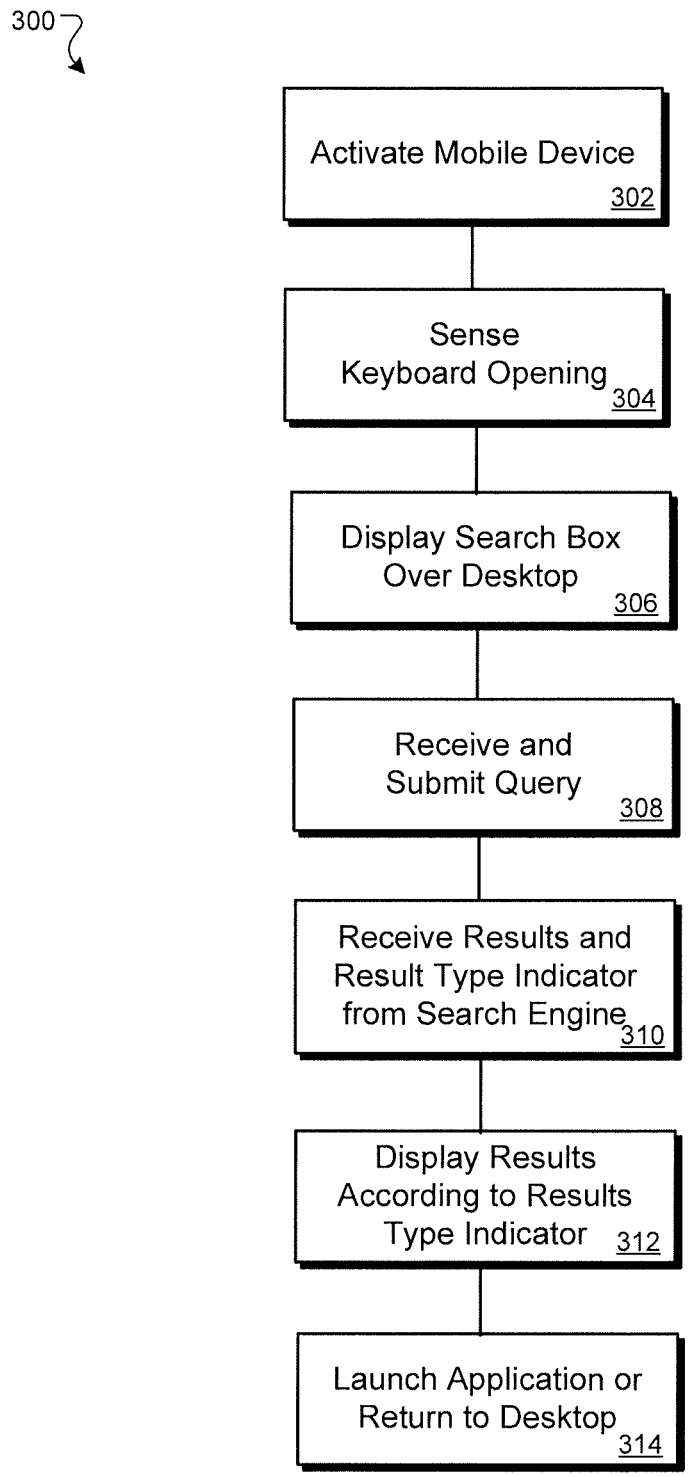
FIG. 3A is a flow chart of a process for displaying a search box to a user of a computing device in response to opening of the device keyboard.

FIG. 3A is a flow chart of a process 300 for displaying a search box to a user of a computing device in response to opening of the device keyboard. The process 300 starts at box 302, where a mobile device is activated by a user. For example, the user may power on the mobile device 100 and slide open the keyboard 106. At box 304, the keyboard opening is sensed. For example, device 100 may include a hardware switch that is activated upon sliding open the keyboard 106. Alternatively, a user can press a key on the keyboard to "activate" the keyboard, and a search box may be displayed automatically with the selected character in the box, particularly where the active application on the device is not an application that would receive typed input. In this example, the user may not be actively using the mobile device and as such, there may be no context or application by which to determine a specific type of search box to present upon engaging the keyboard. In other implementations, the active application can be used to determine configuration parameters for search queries.

At box 306, a search box is displayed over the mobile device desktop or application. For example, the device 100 shown in FIG. 1 depicts a search box 110 displayed over a mobile device mapping application. In this example, the user can now use the keyboard 106 to enter search terms into the search box. In some implementations, the search box may be displayed on a portion of the mobile device desktop (e.g., off to one edge of a display) rather than over the entire desktop. For example, the search box can be displayed as a pop-up, a sidebar, a corner menu, etc. If the user wishes to employ the search box, the user can use the unveiled keyboard to input search terms.

At box 308, the mobile device 100 may receive the user-entered search terms and submit the query to the search engine. The user-entered characters may be entered automatically into the search box without a need for any action other than exposing the keyboard. After the user submits the search query, the mobile device 100 may receive (box 310) results and result type indicators from the search engine. The result type indicators can be used to determine which applications will be responsible for presenting search results to a user. In general, the search engine may determine how to display search results to a user in an appropriate manner. The search results may also be accompanied by code to cause the display of search results, such as mark-up code for displaying a map with pins showing search results, in a browser.

At box 312, the search engine can display results according to the results type indicator. For example, if the user accessed the search box within a music application, search results may be displayed within the music application GUI. In some implementations, search queries entered into a particular search box can be limited to the type of application receiving the search results. For example, search queries entered in a music application may be limited to providing search results that include music, lyrics, titles, bands, and the like.

At box 314, the search engine can prompt the mobile device 200 to launch a particular application or return to the desktop after presentation of the search results. For example, if the user was accessing an application before sliding the keyboard open, that application may be presented upon performing the search query or upon exiting the search box.

Figure 3B:
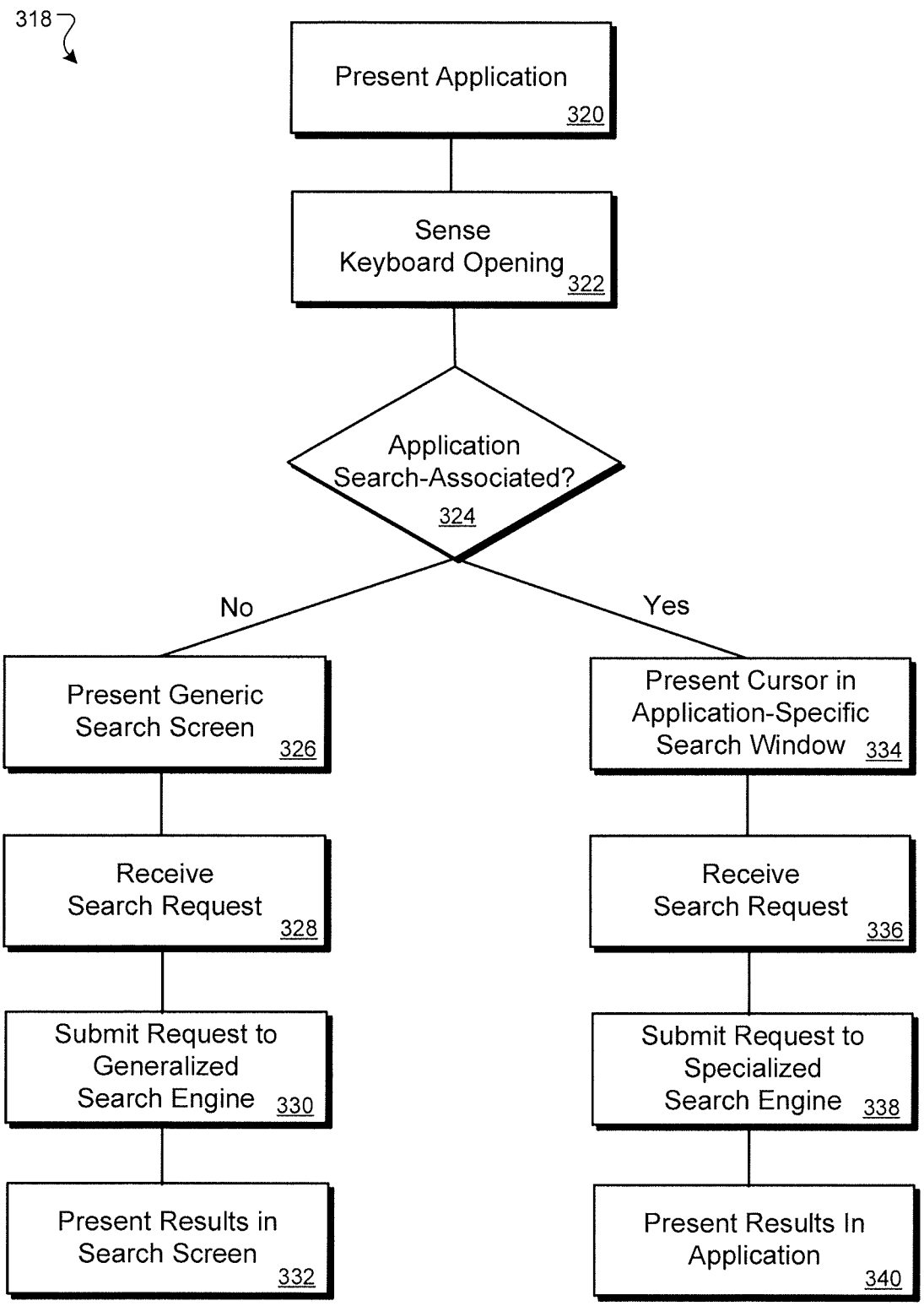
FIG. 3B is a flow chart of a process for displaying a search box with certain select applications.

FIG. 3B is a flow chart of a process 318 for displaying a search box with certain select applications. In one example, the process 318 may be performed when context exists for generating a particular search box or providing a contextually dependent response to a user. The context may, for example, be related to one or more applications open or active on the mobile device 100. For example, the user may be using applications to read email, browse the web, or play music on device 100 and may wish to search for items pertaining to one of the open applications. The mobile device 100 can determine which application is currently active (e.g., in use) and provide a search box related to the active application.

The process 318 starts at box 320, where an application is presented on a mobile device. In a specific example, the mobile device 100 may present a music application in which a user can listen to music and at some point can determine to search for new music.

At box 322, the process 318 senses a keyboard opening. For example, if the user determines to engage the keyboard for any reason, the mobile device 100 can sense a user manipulation triggering the keyboard opening. Upon sensing the keyboard opening, the process 318 can determine, at box 324, if an active application is search-associated. Search-associated applications include programs that are responsive to search input. As an example, a mapping application may be deemed search-associated since a search for address information can be performed. In contrast, a calculator application may not be search-associated since the calculator application generally performs calculations and cannot provide other searchable information. In another example, a music application may be search-associated because users can perform searches within the application for songs, artists, playlists, artwork, and other music related items.

The process 318 can determine if a particular application is search-associated in various ways. For example, the mobile device 100 can require each application to register with the operating system running the device 100. The registration can set a flag for determining if the application is search-associated, and if so, other registration information can be used to determine which search screens or other interactions can be presented to a user.

In some implementations, a separate value may be stored to dictate the type of search to be performed, such as mapping search for a mapping-related application. In another example, the mobile device 100 may query each active application to determine whether a search box should be opened for that application when the keyboard is uncovered. In particular, the mobile device 100 may determine that a particular application is search-associated with several types of search and may query the application to determine which resources within the application are in use. For example, if the user is using a music application and has a library screen open, the mobile device 100 can determine to present a combination search box allowing the user to search both the open library and the web. However, if the user is actively listening to music with the music application, the mobile device 100 can present a context sensitive search box for searching music within the user's library archives.

In some implementations, an application program interface (API) can be used so that third parties may develop applications and provide such information readily to the operating system. The API may include routines, protocols, and other tools to integrate within a particular search environment. In one example, the API may allow a software application to easily identify itself to the operating system for ensuring search application integration.

If the process 318 determines an active application is not search-associated, a generic search screen can be presented, at box 326. That is, a separate search box can be presented outside of the active application. The user can then enter a search into the generic search screen and the process 218 can receive the search request at box 328.

At box 330, the process 318 submits the received request to a generalized search engine. For example, the mobile device 100 submits the search query to a search engine. The search engine can provide a listing of matching web pages, files, documents, or other content and present the results in a search screen at box 332. In some implementations, if a particular active application program is not responsive to search input, search results can be displayed in a display apart from the active application.

If the process 318 determines an active application is search-associated at box 324, a cursor can be presented in an application specific search window, at box 334. For example, FIG. 1 includes a cursor 110 shown within a mapping search box 108 because the mapping search box 108 is associated with the active mapping program application. Thus, when the user activates the keyboard 106, the search box 108 is displayed with cursor 110 for receiving search queries related to the mapping application. The user can then enter a search into the application-specific search window and the process 318 can receive the search request at box 336.

At box 338, the process 318 submits the received request to a specialized search engine. For example, the mobile device 100 submits the search query to a search engine adapted to find content tailored to the active application. One example having application specific search query functionality may include a mapping application that provides lookup for address locations. Users can request address location information and the search engine can provide a listing of possible address matches within the mapping application window, at box 340.

In general, if an active application is responsive to search input, the application itself can present search boxes, search results, or other search related content. In addition, if the active application can obtain search results from a search set type corresponding to the active application type, the search results may displayed within the active application. For example, if the search set type is a map search, corresponding search results may be displayed within the mapping application. As another example, if the search set type is a local search, the search results may be displayed in a text file, a generic search window, or other application. In a similar fashion, general web searches, book searches, blog searches, and produce searches can all be displayed within a web browser, for example.

In some implementations, the mobile device 100 may not be an internet enabled phone, or a user may simply choose not to purchase internet service. In such a case, search queries can be performed to retrieve media, files, applications, and other information stored locally on the mobile device 100 rather than over the internet.

Figure 4:
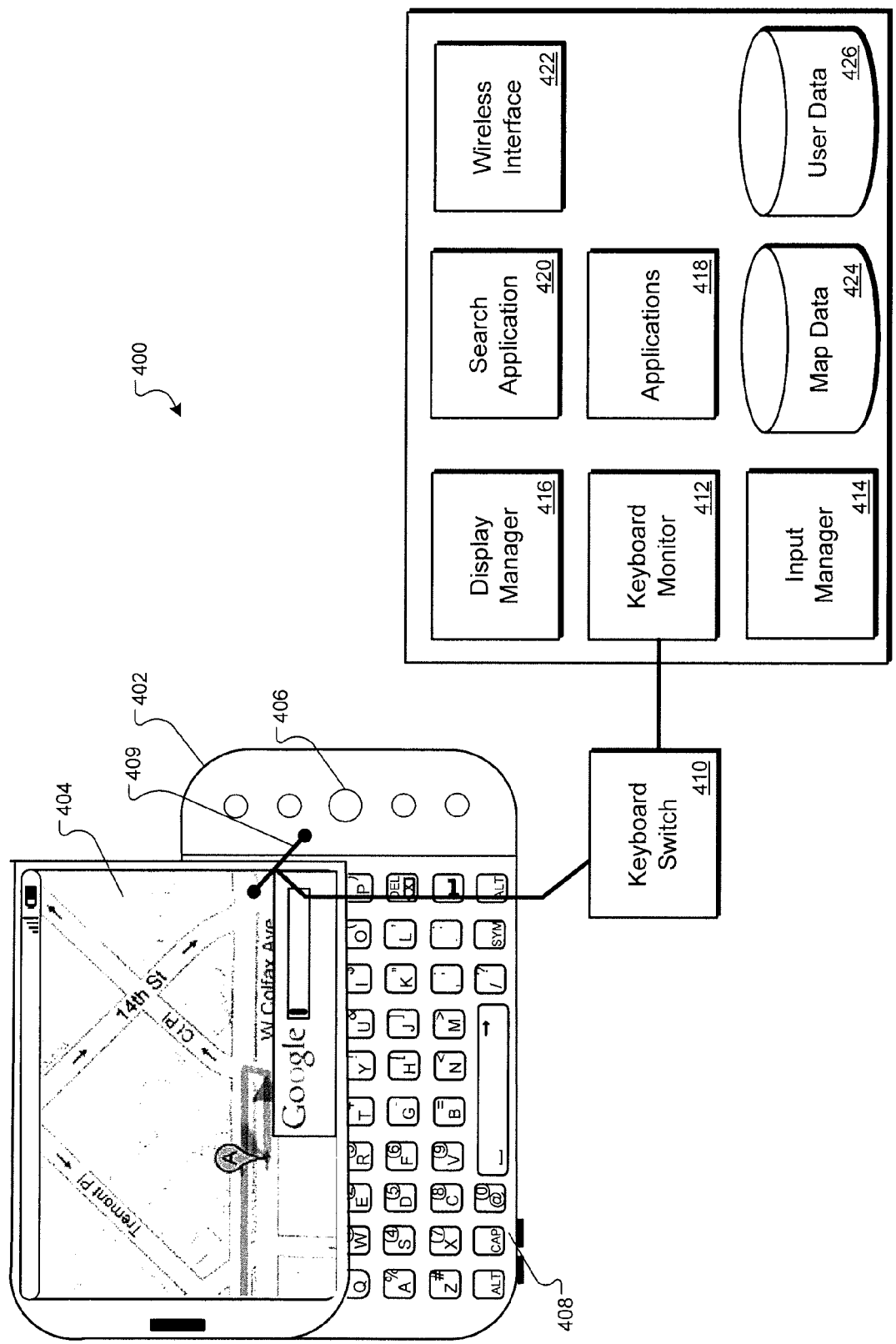
FIG. 4 is a schematic diagram of a mobile device system for providing contextual search interactivity to a user.

FIG. 4 is a schematic diagram of a mobile device system 400 for providing contextual search interactivity to a user. The system 400 may be implemented using a mobile device such as device 402. The device 402 includes various input and output mechanisms such as a touch screen display 404 and a roller ball 406. A number of components within device 402 may be configured to provide search functionality for applications on display 404, such as the concealable keyboard 408.

One such component is a keyboard switch 410, which may be responsible for triggering a search box for presentation on display 404 when keyboard 408 is opened. The keyboard 408 is shown as a QWERTY slide-out keyboard connected to a keyboard monitor 412 via linkage 409. The linkage may take a variety of forms, and may include a four-bar linkage that anchors itself on the right-hand side of the device 402, and connects behind the display 404. Such a mechanism may advantageously permit the display 404 to slide further upward 410 than might be possible with other arrangements (though the display 404 is not shown fully extended in this example) so as to permit the implementation of a more complete keyboard 408.

A keyboard monitor 412 is generally a software module that keeps track of the position of the keyboard 408, and may be a component of the operating system that announces an event to an event manager. That is, the keyboard monitor 412 can determine whether the keyboard 408 is in a first mode (e.g., concealed) or a second mode (e.g., open and accessible to the user) using keyboard switch 410, and may report any changes in the state of the switch 410. The keyboard monitor 412 can generally report events to the operating system, including events such as when the keyboard is opened or closed, when text is entered, or when a search is performed, just to name a few examples.

The mobile device 402 also includes an input manager 414 that interacts with the keyboard monitor 412 to manage inputs (e.g., text entry, button depresses, etc) on a touch screen or keyboard 408, and to provide the inputs to the appropriate applications. In general, the input manager 414 may be responsible for translating commands provided by a user of device 402. For example, such commands may come from a keyboard, from touch screen display 404, from trackball 406, or from other such sources, including dedicated buttons or soft buttons (e.g., buttons whose functions may change over time, and whose functions may be displayed on areas of display 404 that are adjacent to the particular buttons). The input manager 414 may determine, for example, in what area of the display commands are being received, and thus for which application being shown on the display the commands are intended. In addition, the input manager 414 may interpret a keyboard opening to indicate that the user wishes to perform a search for content upon opening the keyboard. The input manager 414 may also report such inputs to an event manager (not shown) that in turn reports them to the appropriate modules or applications.

The mobile device 402 also includes a display manager 416, which may be responsible for rendering content for presentation on display 404. The display manager may receive graphic-related content from a number of sources and may determine how the content is to be provided to a user. For example, the mobile device 402 presents mapping content in a landscape mode since the keyboard 408 is open and may be used to enter content while peering at screen 404. In another implementation, the keyboard 408 may be closed such that the user may position the phone vertically and view content in screen 404 in a portrait mode (e.g., see the transition from vertical to horizontal shown in FIG. 2B). In another example, a number of different windows for various applications 418 on the device 402 may need to be displayed, and the display manager 416 may determine which to display, which to hide, and what to display or hide when there is overlap between various graphical objects.

A variety of applications 418 may operate on a common microprocessor on the device 402. The applications 418 may take a variety of forms, such as mapping applications, email and other messaging applications, web browser applications, and various applications running within a web browser or running extensions of a web browser. In particular, mobile device 402 can provide a search application 420 to contextually or non-contextually search for content upon receiving a signal from the keyboard switch 410. For example, the search application 420 can generate a search box automatically when the keyboard monitor 412 determines that the keyboard 408 has moved from the concealed mode to the open mode. In addition, the search application 420 can handle input from a user and submission of that input to a remote search engine to return search results. The search application may be invoked by invoking a web browser and directing the browser to a particular URL, such as www.google.com.

The search application 420 can also provide the results to various applications that are operating on the device 402. For example, the search application 420 can verify (via the operating system on device 402), which database, network, or website should be used to perform the search. For example, the search application 420 can determine which search result type is relevant to an active application, so that the search application may, when a particular application is active, generate the appropriate type of search box and also submit the search query to the appropriate type of search engine.

In operation, the search application 420 can determine which type of search box or screen to provide within an application and how and where the results might be displayed to the user. For example, if the mobile phone 400 is running a text editor application such as SMS or MMS texting, email, tasks, or other text application, the search application 420 may pop up or otherwise provide a search screen including one or more of an address search, a dictionary, an instant messenger list, etc. In another example, if the mobile device 400 is running a camera application, the search application 420 may provide a search tool to find memory, photos, camera configuration menus, etc. In yet another example, if the mobile device 400 is running a calendar application, the search application 420 may provide a search tool to find the next open appointment or next calendar entry. In still another example, if the mobile device 400 is running a media player application, the search application 420 may provide a search tool to find songs, artists, albums, ringtones, music, and such on the web or within local or networked drives and directories. In another example, if the mobile device 400 is running a mapping application, the search application 420 may provide a search tool to find addresses, driving directions, local maps, local destinations, phone numbers, etc.

A wireless interface 422 manages communication with a wireless network, which may be a data network that also carries voice communications. The wireless interface 422 may operate in a familiar manner, such as according to the examples discussed below, and may provide for communication by the device 402 with messaging service such as text messaging, e-mail, and telephone voice mail messaging. In addition, the wireless interface 422 may support downloads and uploads of content and computer code over a wireless network.

Various forms of persistent storage may be provided, such as using fixed disk drives and/or solid state memory devices. Two examples are shown here. First, map data 424 includes data representing one or more geographic maps or GPS data that may be displayed on device 402. The map data 424 may include a limited number of maps, such as a single map, in memory shared with many other components of the system 400 where the device 402 uses a web browser or similar system to access online maps. Alternatively, a number of maps for an entire geographic area may be loaded into map data store 424 and used by device 402 to reduce the need to download map content while the device 402 is being used.

Other storage includes user data 426, which may be stored on the same media as map data 424. The user data 426 includes various parameters about a user of the device 402. In the example relevant here, the user data may include data defining user names, passwords, preferences, etc. The user data 426 can also store configuration data for each user's preferred search engine, search type, result presentation, button assignment, and other such usability preferences.

In operation, the keyboard monitor 410 can generate a signal when the keyboard 408 is transitioned from concealed mode to open mode. The input manager 414 can then automatically direct user-entered text into the provided search box. Specifically, the search application 420 may be programmed to automatically position an active cursor in the search box upon automatically presenting the search box. The input manager 414 can also automatically place any keyboard entered content into the search box.

Using the pictured components, and others that are omitted here for clarity, the device 402 may provide particular search screens in response to sliding a keyboard into active use. Specifically, the device 402 may respond to the keyboard opening in particular ways depending on which applications are currently active in screen 404, for example. In addition, the device 402 can determine how to perform a search and present search results depending on the active application The mobile device 400 can generate and display a search box in various ways. In one example, a search box can be displayed as a pop-up box over an active application. In some implementations, the pop-up box can be directed to search within the active application. In other implementations, the pop-up box can be directed to search the web or other external network.

In another example, a search box can be generated over a full screen (e.g., as shown in FIG. 2A). Here, the search box may be a standard search engine that searches the web upon receiving search query information. A search box can also be provided centered, side-barred, bannered, corner rising, or anywhere over a particular active application. In some implementations, the search box may be provided in a menu or drop-down box within the application that can appear upon mouse-over, for example. In such an example, the search box may be transparent in the screen until the user performs a mouse-over using roller ball 406, for example.

In some implementations, the user can pre-configure the layout of one or more search controls within one or more applications. In a similar fashion, the user may pre-configure a generalized search box or desktop displayed search box. In other implementations, standard search engine technology can simply be merged into each application such that a standard search bar is shown within appropriate applications.

The use of the aforementioned mechanisms may allow a user of a mobile device to search more quickly and seamlessly through web content or application content on their mobile device without having to select and navigate to search engines and buried search functions. They may quickly see if an application is associated with search functionality and perform a search on the fly to obtain desired information.

Figure 5:
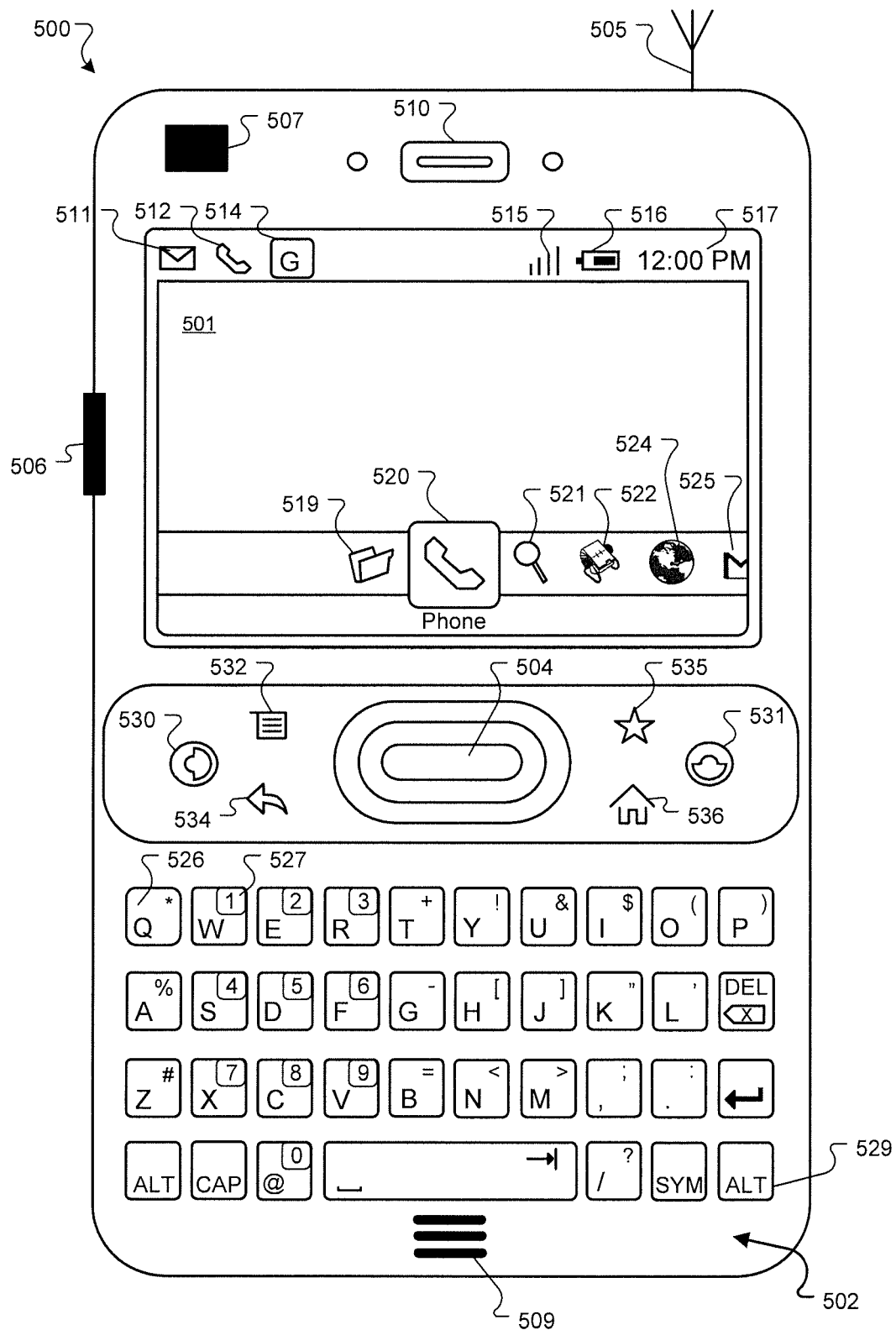
FIG. 5 is a schematic representation of an exemplary mobile device that implements embodiments of the display techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540 power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bidirectional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
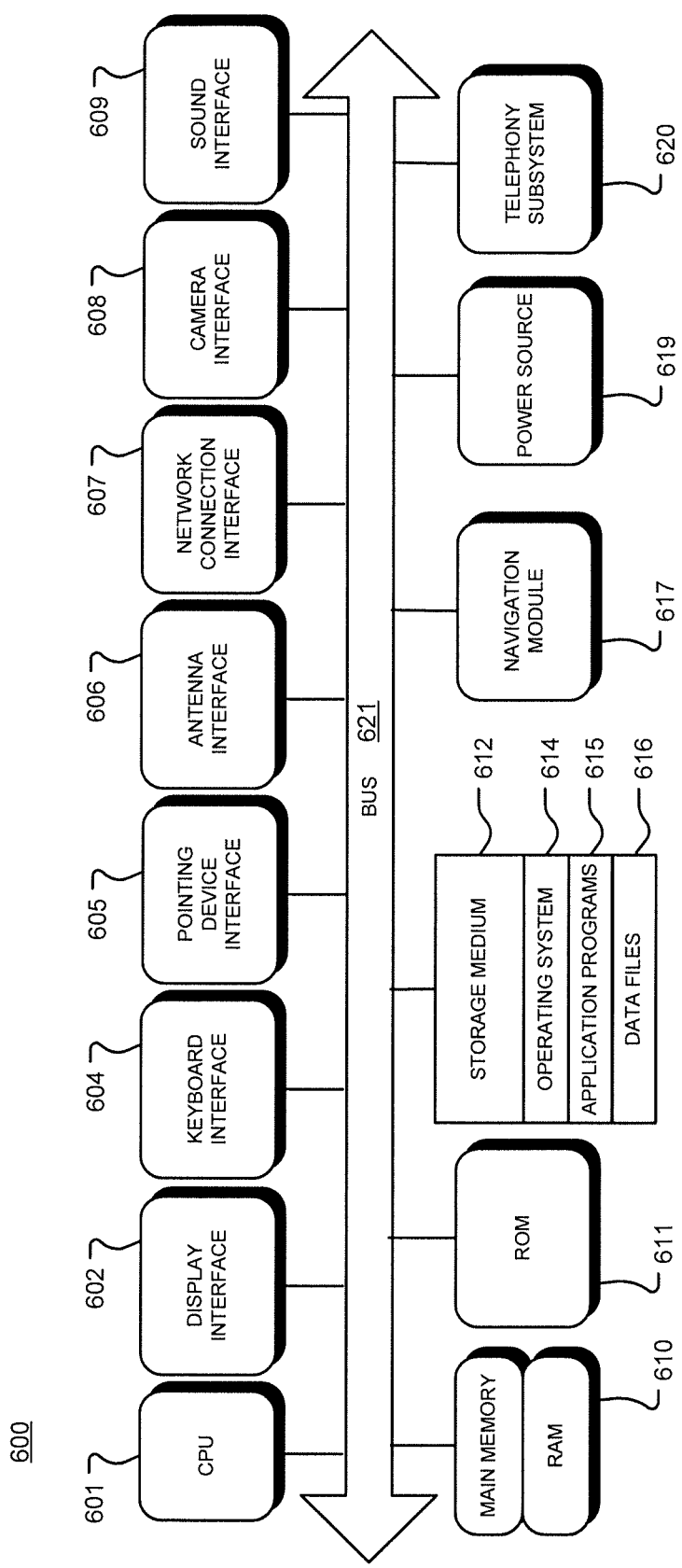
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
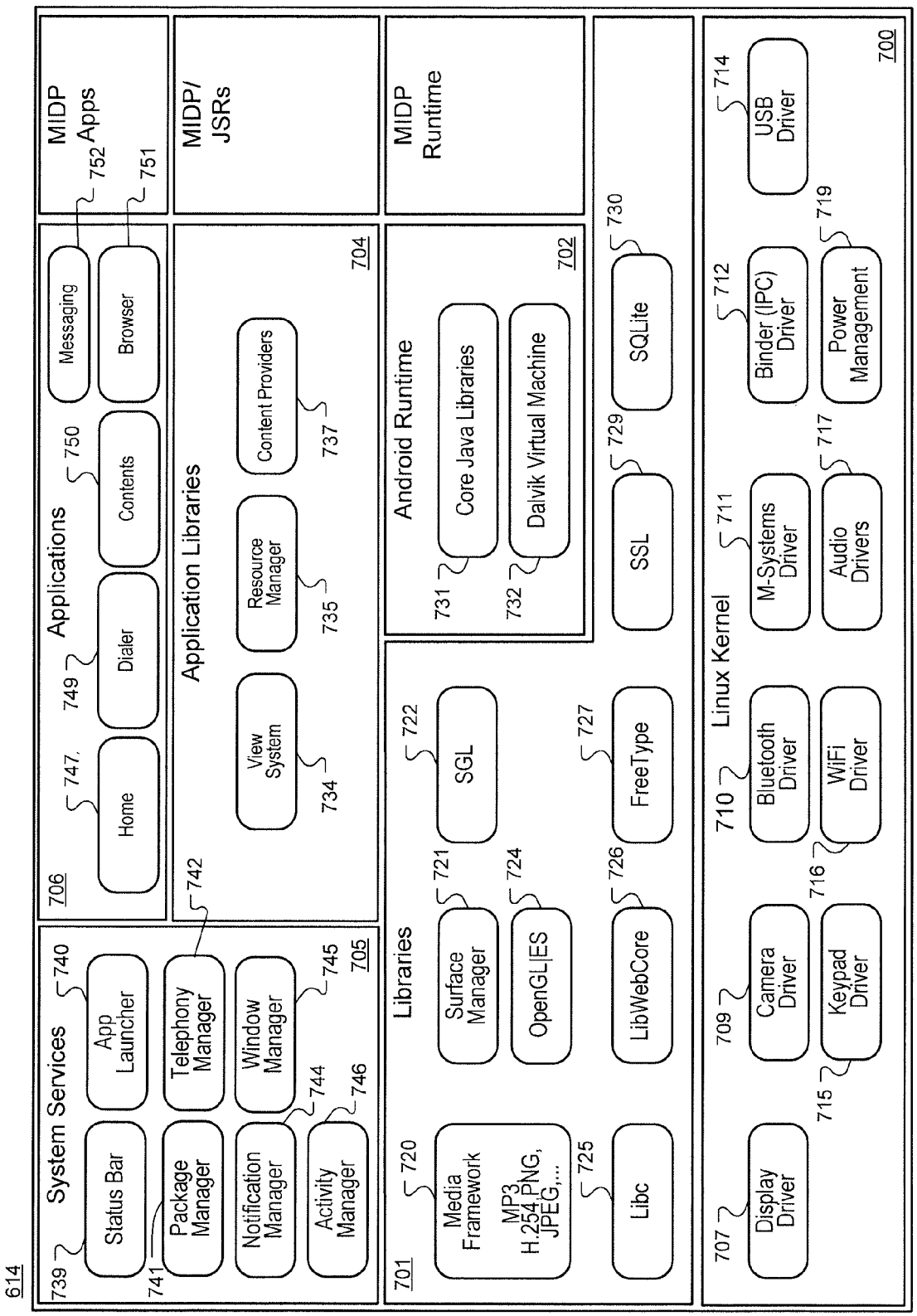
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
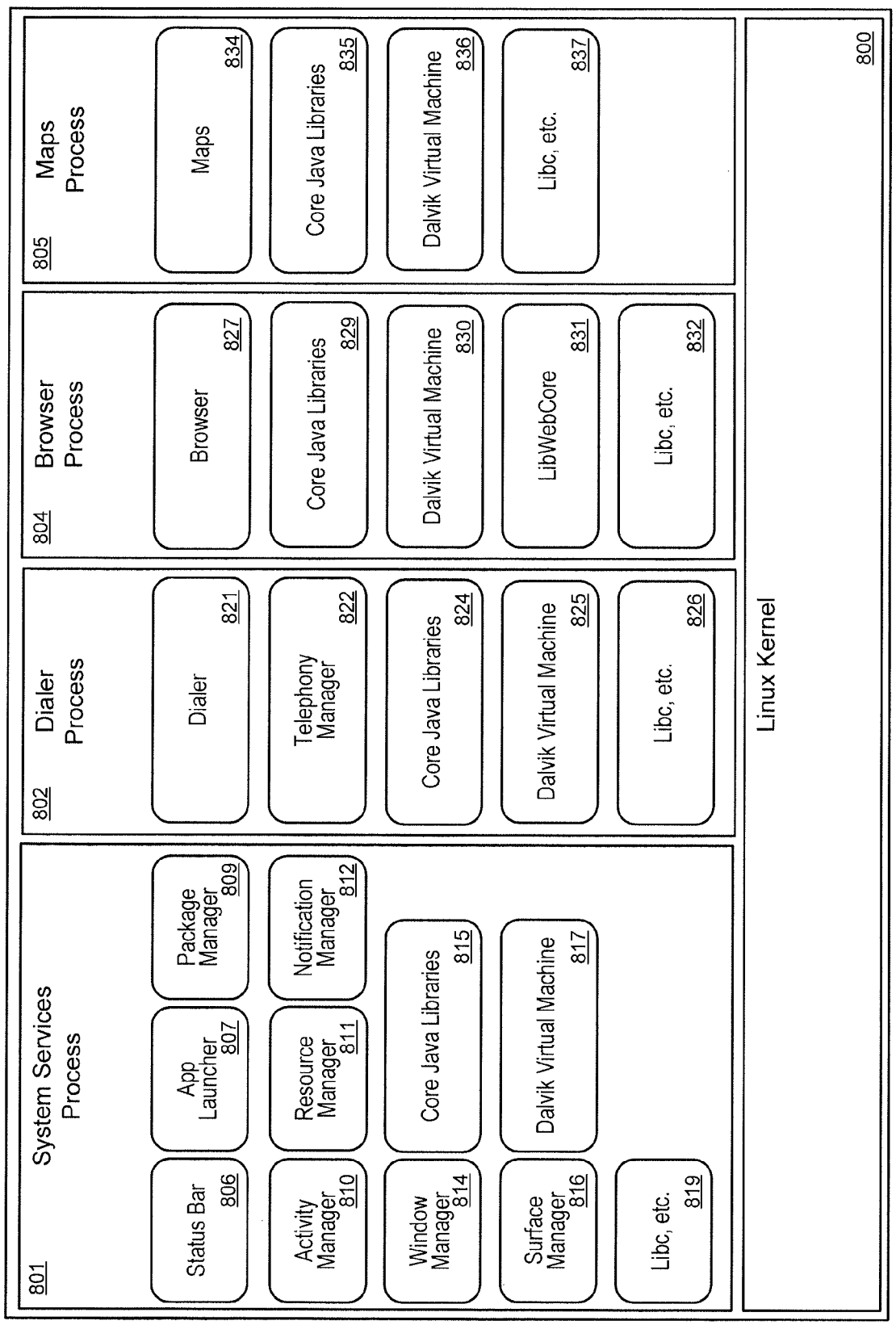
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
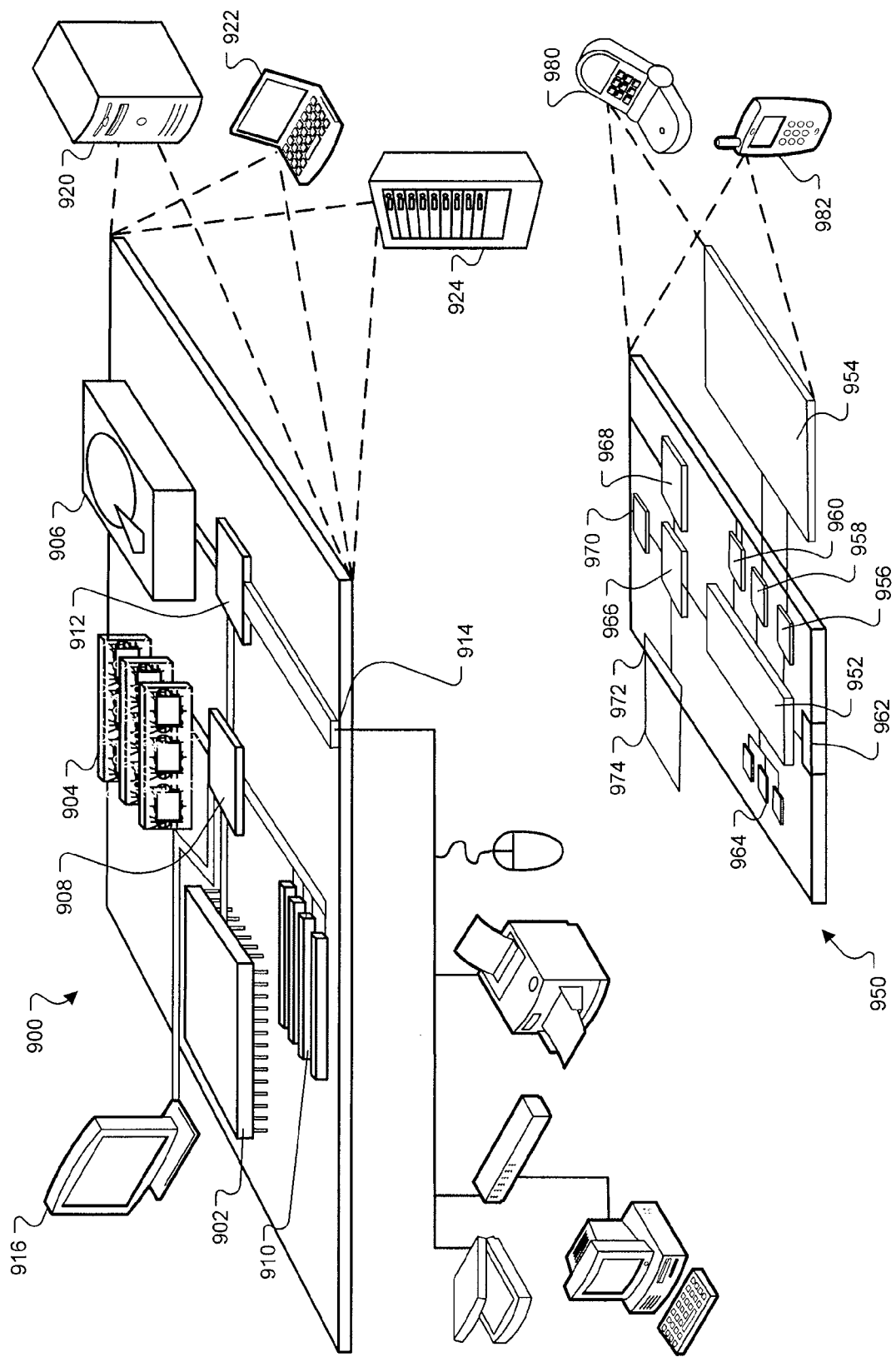
FIG. 9 shows an example of a computer device and a mobile computer device that can be used to implement the techniques described herein.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user input method, comprising:
    outputting, by a mobile device, an active application for display;
    sensing a user manipulation of the mobile device;
    in response to the user manipulation of the mobile device and before receiving typed user input, determining whether the active application is search-associated by identifying whether the active application can provide search results associated with the active application in response to a user-submitted search request, wherein determining whether the active application is search-associated comprises determining which resources in the active application are in use; and
    in response to a determination that the active application is search-associated:
        outputting, for display, an application-specific search window,
        receiving, from a user, a search request in the application-specific search window,
        submitting the search request to a specialized search engine, wherein the specialized search engine is adapted to provide search results tailored to the active application, and
        outputting, for display in the active application, search results responsive to the search request.

2. The method of claim 1, further comprising receiving textual user input at a data entry keyboard without a need for the user to navigate to the search entry area.

3. The method of claim 1, wherein the user manipulation comprises sliding a mechanical keyboard from under a front portion of the mobile device, and into an open position.

4. The method of claim 1, wherein the user manipulation comprises rotating the mobile device from a portrait orientation to a landscape orientation.

5. The method of claim 1, further comprising receiving user input on a data entry keyboard and providing the input to a search entry area.

6. The method of claim 1, further comprising positioning an active cursor in a search entry area upon automatically presenting the search entry area.

7. The method of claim 1, further comprising, as a result of determining that the active application is search-associated, displaying a search entry area as a pop up box over the active application.

8. The method of claim 7, further comprising, as a result of determining that the active application is search-associated, changing a display of the active application to reflect the search results.

9. The method of claim 7, wherein the search results are obtained from a search set type corresponding to an application type of the active application.

10. The method of claim 9, wherein the search set type is selected from a group consisting of map search, local search, web search, book search, blog search, and product search.

11. The method of claim 1, further comprising:
    activating a data entry keyboard in response to sensing a user manipulation of the mobile device, wherein activation of the data entry keyboard comprises moving a physical keyboard from a user-inaccessible position to a user-accessible position.

12. The method of claim 1, further comprising:
    in response to a determination that the active application is not search-associated:
        outputting for display a generic search screen,
        receiving, from the user, a search request in the generic search screen, the search request submitted by the user using a data entry keyboard,
        submitting the search request to a generalized search engine, and
        outputting for display in the generic search screen search results responsive to the search request.

13. A non-transitory computer-readable storage medium having tangibly recorded and stored thereon instructions that, if executed by one or more processors, cause the one or more processors to perform actions comprising:
    outputting an active application for display;
    determining that a data entry keyboard on a computing device has been manipulated into a mode for receiving user data;
    in response to the determining that the data entry keyboard has been manipulated into a mode for receiving user data and before receiving typed user input, determining whether the active application is search-associated by identifying whether the active application can provide search results associated with the active application in response to a user-submitted search request, wherein determining whether the active application is search-associated comprises determining which resources within the active application are in use;
    if the active application is search-associated:
        outputting for display an application-specific search window,
        receiving, from a user, a search request in the application-specific search window,
        submitting the search request to a specialized search engine, wherein the specialized search engine is adapted to provide search results tailored to the active application, and
        outputting for display in the active application search results responsive to the search request; and
    if the active application is not search-associated:
        outputting for display a generic search screen, receiving, from the user, a search request in the generic search screen, the search request submitted by the user using the data entry keyboard, submitting the search request to a generalized search engine, and outputting for display in the generic search screen search results responsive to the search request.

14. The storage medium of claim 13, wherein the instructions are arranged to perform actions further comprising receiving user input on the data entry keyboard and providing the input to a search entry area.

15. A computer-implemented user input system, comprising:

a concealable keyboard having a first mode in which the keyboard is not accessible to a user, and a second mode in which the keyboard is accessible to the user;

a keyboard monitor to determine when the concealable keyboard transitions from the first mode to the second mode; and a search application programmed to generate a search entry area automatically when the keyboard monitor determines that the keyboard has moved from the first mode to the second mode, the search application further programmed to:

in response to determining that the keyboard has moved from the first mode to the second mode and before receiving typed user input, determine whether an active application is search-associated by identifying whether the active application can provide search results associated with the active application in response to a user-submitted search request, wherein determining whether the active application is search-associated comprises determining which resources within the active application are in use;

if the active application is search-associated:
outputting for display an application-specific search window,
receiving, from the user, a search request in the application-specific search window,
submitting the search request to a specialized search engine, wherein the specialized search engine is adapted to provide search results tailored to the active application, and
outputting for display in the active application search results responsive to the search request; and if the active application is not search-associated:
outputting for display a generic search screen,
receiving, from the user, a search request in the generic search screen, the search request submitted by the user using the data entry keyboard,
submitting the search request to a generalized search engine, and
outputting for display in the generic search screen search results responsive to the search request.

16. The system of claim 15, wherein text entered on the keyboard after the keyboard transitions from the first mode to the second mode is entered in the search entry area automatically.

17. The system of claim 15, wherein the keyboard comprises a mechanical QWERTY slide-out keyboard and the keyboard monitor includes a switch in a slide-out mechanism.

18. The system of claim 15, wherein the search application is programmed to automatically position an active cursor in a search entry area upon automatically presenting the search entry area.

19. A computer-implemented user input system, comprising:

a concealable keyboard having a first mode in which the keyboard is not accessible to a user and a second mode in which the keyboard is accessible to the user;

a keyboard monitor to generate a signal when the concealable keyboard transitions from the first mode to the second mode; and means for presenting a search entry area to a user for entry of a search query using the keyboard, by, in response the keyboard monitor generating a signal when the concealable keyboard transitions from the first mode to the second mode and before receiving typed user input, determining whether an active application is search-associated by identifying whether the active application can provide search results associated with the active application in response to a user-submitted search request, wherein determining whether the active application is search-associated comprises determining which resources within the active application are in use;

if the active application is search-associated:
outputting for display an application-specific search window,
receiving, from the user, a search request in the application-specific search window,
submitting the search request to a specialized search engine, wherein the specialized search engine is adapted to provide search results tailored to the active application, and
outputting for display in the active application search results responsive to the search request; and if the active application is not search-associated:
outputting for display a generic search screen,
receiving, from the user, a search request in the generic search screen, the search request submitted by the user using the data entry keyboard,
submitting the search request to a generalized search engine, and
outputting for display in the generic search screen search results responsive to the search request.

* * * * *